US007666332B2

(12) United States Patent
Sasai et al.

(10) Patent No.: US 7,666,332 B2
(45) Date of Patent: Feb. 23, 2010

(54) PROCESS FOR PRODUCING OPTICAL GLASS ELEMENT

(75) Inventors: Jun Sasai, Chiyoda-ku (JP); Syuji Matsumoto, Chiyoda-ku (JP); Takeshi Shimazaki, Chiyoda-ku (JP); Naoki Sugimoto, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/947,976

(22) Filed: Nov. 30, 2007

(65) Prior Publication Data

US 2008/0099937 A1 May 1, 2008

Related U.S. Application Data

(63) Continuation of application No. PCT/JP2006/310695, filed on May 29, 2006.

(30) Foreign Application Priority Data

May 30, 2005 (JP) ............................ 2005-157419

(51) Int. Cl.
*B29D 11/00* (2006.01)
*C03B 11/00* (2006.01)
*C03B 11/12* (2006.01)

(52) U.S. Cl. ............................. 264/2.7; 65/66; 65/102; 264/1.1

(58) Field of Classification Search .................. 65/102, 65/66; 264/1.1–2.7
See application file for complete search history.

(56) References Cited

U.S. PATENT DOCUMENTS 4,921,519 A * 5/1990 Schinker et al. ................ 65/39
7,033,966 B2 4/2006 Kobayashi et al.
2003/0124458 A1* 7/2003 Ichijo et al. ............ 430/270.13
2003/0209035 A1* 11/2003 Fujiwara et al. ................ 65/24
2004/0235634 A1* 11/2004 Kobayashi et al. ............ 501/41
2007/0105702 A1 5/2007 Matsumoto et al.

FOREIGN PATENT DOCUMENTS

JP 62-108741 5/1987
JP 02177401 A * 7/1990
JP 2003-048723 2/2003
JP 2004-035335 2/2004

OTHER PUBLICATIONS

Hidetsugu Mori and Hironobu Sakata, “Oxygen gas-sensing properties of V2O5-Sb2O3-TeO2 glass”, Materials Chemistry and Physics 45 (1996) 211-215.*

* cited by examiner

*Primary Examiner*—Steven P Griffin
*Assistant Examiner*—Cynthia Szewczyk
(74) *Attorney, Agent, or Firm*—Oblon, Spivak, McClelland, Maier & Neustadt, L.L.P.

(57) ABSTRACT

To provide a production process capable of making the transmittance of an optical glass element obtainable by press-molding a $TeO_2$-containing glass high.

A process for producing an optical glass element, which comprises press-molding a $TeO_2$-containing glass, wherein the press-molding is carried out in an atmosphere in which the nitrogen partial pressure is at most $10^2$ Pa. The above process for producing an optical glass element, wherein the face of a mold for the press-molding to be in contact with the glass is made of carbon. The above process for producing an optical glass element, wherein the molded glass obtained by the press-molding is held in an oxygen-containing atmosphere at a temperature within a range of at least a temperature lower by 50° C. than the glass transition point of the $TeO_2$-containing glass and at most the softening point of the glass.

4 Claims, No Drawings

PROCESS FOR PRODUCING OPTICAL GLASS ELEMENT

TECHNICAL FIELD

The present invention relates to a process for producing an optical glass element such as a glass lens made of a $TeO_2$-containing glass.

BACKGROUND ART

Recording and reading on optical recording media such as CD, CD-R, CD-RW, DVD and MO are carried out by making a laser beam a parallel ray by a collimating lens and focusing the ray by an object lens. The collimating lens and the object lens are produced usually by heating a glass or resin preform to a softening point, followed by precision press-molding.

As a glass lens prepared by the above process, one made of a $TeO_2$-containing glass having a high refractive index has been proposed (see Patent Document 1).

Patent Document 1: JP-A-2004-35335

DISCLOSURE OF THE INVENTION

Object to be Accomplished by the Invention

In a case where a lens or the like is produced by subjecting a $TeO_2$-containing glass to press-molding, usually press-molding is carried out in a nitrogen atmosphere so as to prevent oxidation of a mold to be used for molding.

However, press-molding of a $TeO_2$-containing glass in a nitrogen atmosphere has had a problem of a decrease in transmittance at a wavelength in the vicinity of 400 nm, due to a change of the color of the glass from yellow to brown.

The $TeO_2$-containing glass as disclosed in Patent Document 1 has an additional element of Group IV or V of the Periodic Table, such as Sb, Nb, Ta or Bi, which is used with the intention of solving the above problems.

In recent years, further improvement in the transmittance has been required. In order to meet such a requirement, it is an object of the present invention to provide a novel process for producing an optical glass element.

Means to Accomplish the Object

The present inventors have conceived the coloration mechanism when a $TeO_2$-containing glass is subjected to precision press-molding in a nitrogen atmosphere by using a mold made of tungsten carbide (WC) covered with carbon as follows, and accomplished the present invention. Namely, they have conceived that when glass is subjected to press-molding in a nitrogen atmosphere at a temperature higher than the glass transition point (Tg), nitrogen in the atmosphere will be included in the glass and firmly bonded to Te under the influence of carbon and will cause coloration, on the basis of which they have conducted research. As a result, they have achieved the invention with the following subject matters, which achieves the above object.

(1) A process for producing an optical glass element, which comprises press-molding a $TeO_2$-containing glass, wherein the press-molding is carried out in an atmosphere in which the nitrogen partial pressure is at most $10^2$ Pa.

(2) The process for producing an optical glass element according to the above (1), wherein the pressure in the atmosphere is at most $10^2$ Pa.

(3) The process for producing an optical glass element according to the above (1) or (2), wherein the face of a mold for the press-molding to be in contact with the is glass is made of carbon.

(4) The process for producing an optical glass element according to the above (1), (2) or (3), wherein the molded glass obtained by the press-molding is held in an oxygen-containing atmosphere at a temperature within a range of at least a temperature lower by 50° C. than the glass transition point of the $TeO_2$-containing glass and at most the softening point of the glass.

(5) The process for producing an optical glass element according to the above (4), wherein the oxygen partial pressure in the oxygen-containing atmosphere is at least $3\times10^4$ Pa.

(6) The process for producing an optical glass element according to any one of the above (1) to (5), wherein the $TeO_2$-containing glass contains at least one component selected from the group consisting of $Ga_2O_3$, $Bi_2O_3$, $Ta_2O_5$ and $TiO_2$.

Effects of the Invention

It is possible to increase the transmittance of an optical element such as a lens produced by precision press-molding of a $TeO_2$-containing glass by using a mold made of WC covered with carbon.

BEST MODE FOR CARRYING OUT THE INVENTION

The optical glass element in the present invention is typically a lens.

The press-molding to produce a lens is commonly precision press-molding. The precision press-molding is carried out by heating and softening in a mold a preform obtained by processing glass, preferably at a temperature within a range of at least a temperature lower by 50° C. than the glass transition point (Tg) of the $TeO_2$-containing glass and at most the softening point (Ts) of the glass, particularly preferably at a temperature within a range of at least the glass transition point and at most a temperature lower by 20° C. than the softening point of the glass. The preform may be prepared by directly molding glass in a molten state.

The face of a mold to be used for a press-molding which will be in contact with the glass is usually made of carbon. For a mold to be used for the precision press-molding, WC, SiC or the like covered with carbon, is usually used for at least the face of the mold.

In the present invention, the nitrogen partial pressure in an atmosphere in which the press-molding is carried out is at most $10^2$ Pa. If the nitrogen partial pressure exceeds $10^2$ Pa, a decrease in the transmittance such as a transmittance ($T_{405}$) to a light having a wavelength of 405 nm, can not be suppressed. The nitrogen partial pressure is preferably at most 50 Pa, typically at most 10 Pa, and particularly preferably at most 5 Pa. The nitrogen partial pressure is preferably as low as possible, but nitrogen at a level (0.1 Pa) of inevitable inclusion due to the structure of the apparatus may be present.

The atmosphere in which the press-molding is carried out may be any atmosphere of e.g. an inert gas such as He, Ar or Ne, $O_2$ or $H_2$, so long as the nitrogen partial pressure is within the above range, but the atmosphere is preferably $O_2$ or an inert gas. A means to bring the nitrogen partial pressure in the atmosphere in which the press-molding is carried out within the above range is not particularly limited. For example, the above nitrogen partial pressure can easily be achieved by bringing the pressure in the atmosphere in which the press-molding is carried out be at most $10^2$ Pa by gauge pressure, preferably at most 50 Pa by means of a vacuum pump.

The $TeO_2$-containing glass is preferably one which is melted at a temperature of 980° C. or lower, otherwise it will be difficult to melt the glass by using a gold crucible (melting point: 1,063° C.), and the glass must be melt by using a platinum or platinum alloy crucible. As a result, platinum may be dissolved in the glass, thus decreasing $T_{405}$.

The $TeO_2$-containing glass before the press-molding preferably has $T_{405}$ as calculated in a thickness of 1 mm of at least 90%. If it is less than 90%, use of the resulting lens as the above-described lens will be difficult. It is more preferably at least 92%, particularly preferably at least 94%.

The refractive index ($n_{405}$) of the $TeO_2$-containing glass to a light having a wavelength of 405 nm is preferably at least 1.92. If it is less than 1.92, it will be difficult to obtain an object lens having a thickness (typical thickness of from 1.5 to 3.5 mm) applicable to recording on an optical recording medium and having a desired numerical aperture (typically from 0.65 to 0.85). $n_{405}$ is more preferably at least 1.94, particularly preferably at least 1.97, most preferably at least 1.99. $n_{405}$ is typically at most 2.1.

The content of $TeO_2$ in the $TeO_2$-containing glass is not limited but is typically at least 10%, and in a case where it is desired that $n_{405}$ is high, it is usually at least 30%. In this specification, the content of each component in the glass is represented by percentage by mol.

In a case where it is desired that $T_{405}$ and $n_{405}$ are high, the $TeO_2$-containing glass is preferably one consisting essentially of, as represented by mol % based on oxides, from 35 to 54% of $TeO_2$, from 0 to 10% of $GeO_2$, from 5 to 30% of $B_2O_3$, from 0 to 15% of $Ga_2O_3$, from 0 to 8% of $Bi_2O_3$, from 3 to 20% of ZnO, from 0 to 10% of MgO+CaO+SrO+BaO, from 1 to 10% of $Y_2O_3$+$La_2O_3$+$Gd_2O_3$, from 0 to 5% of $Ta_2O_5$+$Nb_2O_5$, from 0 to 1.8% of $TiO_2$, and from 0 to 6% of $Li_2O$+$Na_2O$+$K_2O$+$Rb_2O$+$Cs_2O$. The preferred glass may contain other components. In such a case, the total content of the additional components is preferably at most 10%. For example, "from 0 to 10% of $GeO_2$" means that $GeO_2$ is not essential but may be incorporated up to 10%.

The molded glass obtained by press-molding the $TeO_2$-containing glass in an atmosphere in which the nitrogen partial pressure is at most $10^2$ Pa is held in an oxygen-containing atmosphere at a temperature within a range of at least a temperature lower by 50° C. than the glass transition point of the $TeO_2$-containing glass and at most the softening point of the glass, whereby the transmittance of the molded glass can be made high in some cases. In such a case, the oxygen partial pressure in the oxygen-containing atmosphere is typically preferably at least $3\times10^4$ Pa, particularly preferably from $5\times10^4$ to $5\times10^5$ Pa. Further, the $TeO_2$-containing glass typically contains at least one component selected from the group consisting of $Ga_2O_3$, $Bi_2O_3$, $Ta_2O_5$ and $TiO_2$.

EXAMPLES

Materials were blended to achieve the composition shown by mol % in the lines for $TeO_2$ to $TiO_2$ in Table 1 to prepare 450 g of a material preparation, which was put into a crucible made of gold and having a capacity of 300 cc and melted for 2.5 hours at 950° C. At that time, the molten glass was homogenized by stirring for 1 hour by means of a stirrer made of gold. The homogenized molten glass was cast in a carbon mold and formed into a plate shape, followed by annealing by holding the glass at a temperature of (Tg-5° C.) for 4 hours and then cooling it at a rate of 1° C. per minute.

As the materials, tellurium dioxide having a purity of at least 99.999% manufactured by Shinko Chemical Co., Ltd., boron oxide and titanium oxide each being a special grade chemical manufactured by KANTO CHEMICAL CO., INC., lanthanum oxide, yttrium oxide and gadolinium oxide each having a purity of 99.9% manufactured by Shin-Etsu Chemical Co., Ltd., special grade gallium oxide manufactured by Rare Metallic Co., Ltd., zinc oxide having a purity of at least 99.999%, germanium oxide having a purity of at least 99.995%, bismuth oxide having a purity of at least 99.99% and tantalum oxide having a purity of at least 99.9%, each manufactured by Kojundo Chemical Laboratory Co., Ltd., etc., were used.

With respect to obtained glass A to D, Tg, the yield point Ta and the softening point Ts (each unit: ° C.), the internal transmittance $T_I$ (unit: %) to a light having a wavelength of 405 nm as calculated in a thickness of 1 mm, $n_{405}$, the refractive index $n_d$ to d line and the Abbe number $\nu_d$ were measured. Their measurement methods are described below.

Tg, Ta: Measured with respect to a sample processed into a columnar shape having a diameter of 5 mm and a length of 20 mm by means of a thermal mechanical analyzer (DILATOMETER 5000 manufactured by MacScience) at a temperature rising rate of 5° C./min.

Ts: Measured with respect to a sample processed into a columnar shape having a diameter of 10 mm and a length of 10 mm by means of a viscometer (WRVM-313 manufactured by OPT Corporation).

$T_I$: With respect to two sample plates having a size of 2 cm×2 cm and thicknesses of 1 mm and 5 mm, both sides of which are mirror-polished, the transmittance to a light having a wavelength of 405 nm is measured by means of a spectrophotometer (U-3500 manufactured by Hitachi Ltd.). $T_I$ (unit: %) is calculated from the following formula, where $T_{1\ mm}$ and $T_{5\ mm}$ are transmittances of sample plates having thicknesses of 1 mm and 5 mm, respectively, obtained by the measurement:

$$T_I=100\times\exp[(2/3)\times\log_e(T_{5\ mm}/T_{1\ mm})]$$

$n_{405}$, $n_d$ and $\nu_d$: The glass was processed into a triangular shaped prism having one side of 30 mm and a thickness of 10 mm, which was measured by a precision spectrometer (GMR-1 manufactured by Kalnew Optical Company).

TABLE 1

| | Glass | | | |
|---|---|---|---|---|
| | A | B | C | D |
| $TeO_2$ | 51.0 | 51.0 | 47.0 | 46.8 |
| $GeO_2$ | 0 | 4.0 | 3.0 | 3.0 |
| $B_2O_3$ | 29.0 | 19.0 | 19.0 | 19.0 |
| $Ga_2O_3$ | 0 | 5.0 | 5.0 | 5.0 |
| $Bi_2O_3$ | 0 | 0 | 5.0 | 5.0 |
| ZnO | 15.0 | 15.0 | 15.0 | 15.0 |
| $Y_2O_3$ | 2.0 | 0.5 | 0.5 | 0.5 |
| $La_2O_3$ | 2.0 | 0.5 | 0.5 | 0.5 |
| $Gd_2O_3$ | 1.0 | 3.0 | 3.0 | 3.0 |
| $Ta_2O_5$ | 0 | 2.0 | 2.0 | 2.0 |
| $TiO_2$ | 0 | 0 | 0 | 0.2 |
| Tg | 425 | 437 | 438 | 439 |
| Ta | 466 | 477 | 475 | 475 |
| Ts | 510 | 530 | 530 | 530 |
| $T_I$ | 99 | 99 | 97 | 97 |
| $n_{405}$ | 1.948 | 1.972 | 2.034 | 2.034 |
| $n_d$ | 1.886 | 1.909 | 1.958 | 1.958 |
| $\nu_d$ | 26.9 | 26.4 | 23.8 | 23.9 |

A glass plate made of the glass identified in the line for glass in Table 2 was processed into a thickness of 5 mm and a size of 10 mm×15 mm, its surface was mirror-polished with a cerium oxide powder slurry to prepare a sample for pressing, which was subjected to press-molding in a pressing atmosphere at a pressing temperature (unit: ° C.) as identified in Table 2 and further subjected to oxygen heat treatment. The thickness of the sample (pressed product) after the press-molding is shown in the line for the pressed product thickness (unit: mm) in Table 2. Examples 1 to 4 are Examples of the present invention and Example 5 is a Comparative Example.

The press-molding was carried out as follows. Namely, the sample for pressing was sandwiched between two mirror-polished glassy carbon plates having a thickness of 10 mm and a size of 30 mm×30 mm, and the sandwich was set in a precision press-molding apparatus (GMP-207HV, manufactured by TOSHIBA MACHINE CO., LTD.). Then, the temperature was increased to the pressing temperature as identified in Table 2, and a force of $0.2\times10^3$ N was applied and maintained for 330 seconds to carry out press-molding of the sample for pressing.

"Vacuum" in the line for the pressing atmosphere means that the press-molding was carried out under a pressure in the interior of the chamber of the precision press-molding apparatus of 1.2±0.8 Pa, and "nitrogen" in the line for pressing atmosphere means that the press-molding was carried out in an atmosphere (gauge pressure of $(1.0\pm0.1)\times10^5$ Pa) such that the interior of the chamber was filled with nitrogen gas.

$T_P$ in Table 2 is the internal transmittance of the sample after the press-molding to a light having a wavelength of 405 nm as calculated in a thickness of 1 mm, and measured as follows. Namely, the transmittance $T_P'$ (unit: %) and the reflectivity R (unit: %) on the glass surface of the pressed product were measured, and calculation was carried out from $T_P=(T_P'+R)^{(1/L)}$, where L (mm) is the thickness of the pressed product.

Further, $\Delta_P$ is $(T_P-T_I)$.

The oxygen heat treatment was carried out as follows. Namely, the pressed product was immersed in a 0.001 N nitric acid aqueous solution for 10 seconds and then subjected to ultrasonic cleaning in pure water for 5 minutes and in isopropyl alcohol for 5 minutes. The pressed product thus cleaned was put in a furnace having a cylindrical chamber made of alumina and subjected to heat treatment of increasing the temperature to 425° C. and then decreasing the temperature while the pressure in the furnace was constant within a range of $(1.06\pm0.05)\times10^5$ Pa and the interior of the furnace was filled with oxygen gas. The heat treatment was carried out in such as manner that the temperature of the atmosphere in the furnace was increased from 50° C. to 350° C. over 40 minutes, from 350° C. to 400° C. over 30 minutes and from 400° C. to 425° C. over 30 minutes, the temperature was maintained at 425° C. for 60 minutes, and then the temperature was decreased from 425° C. to 100° C. over 180 minutes.

$T_O$ in Table 2 is the internal transmittance of the sample after the oxygen heat treatment to a light having a wavelength of 405 nm as calculated in a thickness of 1 mm and measured in the same manner as for $T_P$. Once pressing is carried out in a state where the nitrogen partial pressure is high as in Example 5, the transmittance remains low and does not recover even if heat treatment in an oxygen atmosphere is carried out.

Further, $\Delta_O$ is $(T_O-T_P)$.

TABLE 2

| | Ex. | | | | |
|---|---|---|---|---|---|
| | 1 | 2 | 3 | 4 | 5 |
| Glass | A | B | C | D | A |
| Pressing atmosphere | Vacuum | Vacuum | Vacuum | Vacuum | Nitrogen |
| Pressing temperature | 465 | 474 | 475 | 475 | 465 |
| Pressed product thickness | 2.7 | 2.2 | 2.5 | 2.5 | 2.8 |
| $T_P$ | 93 | 78 | 83 | 89 | 84 |
| $\Delta_P$ | −6 | −21 | −14 | −8 | −15 |
| $T_O$ | 94 | 89 | 93 | 95 | 84 |
| $\Delta_O$ | +1 | +11 | +10 | +6 | 0 |

INDUSTRIAL APPLICABILITY

A lens having a high transmittance made of a $TeO_2$-containing glass having a high transmittance can be produced.

The entire disclosure of Japanese Patent Application No. 2005-157419 filed on May 30, 2005 including specification, claims and summary is incorporated herein by reference in its entirety.

What is claimed is:

1. A process for producing an optical glass element, which comprises press-molding a $TeO_2$-containing glass, wherein the press-molding is carried out in an atmosphere in which the nitrogen partial pressure ranges from 0.1 Pa to $10^2$ Pa wherein the molded glass obtained by the press-molding is held in an oxygen-containing atmosphere at a temperature within a range of at least a temperature lower by 50° C. than the glass transition point of the $TeO_2$-containing glass and at most the softening point of the glass and wherein the oxygen partial pressure in the oxygen-containing atmosphere is at least $3\times10^4$ Pa.

2. The process for producing an optical glass element according to claim 1, wherein the pressure in the atmosphere is at most $10^2$ Pa.

3. The process for producing an optical glass element according to claim 1, wherein the face of a mold for the press-molding to be in contact with the glass is made of carbon.

4. The process for producing an optical glass element according to claim 1, wherein the $TeO_2$-containing glass contains at least one component selected from the group consisting of $Ga_2O_3$, $Bi_2O_3$, $Ta_2O_5$ and $TiO_2$.

* * * * *